(12) United States Patent
Brunswig et al.

(10) Patent No.: US 8,892,667 B2
(45) Date of Patent: Nov. 18, 2014

(54) SYSTEMS AND METHODS FOR SENDING AND RECEIVING COMMUNICATIONS

(75) Inventors: Frank Brunswig, Heidelberg (DE); Daniel Goldmann, Mannheim (DE); Bare Said, St. Leon (DE); Jan Teichmann, Neustadt/Weinstrasse (DE); Stefan Baeuerle, Rauenberg-Rotenberg (DE); Robert Getzner, Heidelberg (DE); Bernhard Thimmel, Edingen-Neckarhausen (DE)

(73) Assignee: SAP SE, Walldorf (DE)

( * ) Notice: Subject to any disclaimer, the term of this patent is extended or adjusted under 35 U.S.C. 154(b) by 174 days.

(21) Appl. No.: 13/248,820

(22) Filed: Sep. 29, 2011

(65) Prior Publication Data

US 2013/0086174 A1    Apr. 4, 2013

(51) Int. Cl.
*G06F 15/16*    (2006.01)
*G06F 9/54*    (2006.01)

(52) U.S. Cl.
CPC ...................................... *G06F 9/546* (2013.01)
USPC ........................... 709/206; 709/217; 707/769

(58) Field of Classification Search
USPC ........................................................ 709/206
See application file for complete search history.

(56) References Cited

U.S. PATENT DOCUMENTS

| | | | |
|---|---|---|---|
| 2008/0077549 A1* | 3/2008 | Glania et al. ....................... 707/1 |
| 2009/0144721 A1* | 6/2009 | Wagner et al. ................. 717/172 |
| 2011/0149978 A1* | 6/2011 | Moser et al. ................... 370/400 |
| 2011/0314242 A1* | 12/2011 | Satoyama et al. ............ 711/162 |
| 2012/0084390 A1* | 4/2012 | Hara et al. ..................... 709/217 |
| 2013/0031127 A1* | 1/2013 | Klemenz ....................... 707/769 |
| 2013/0151840 A1* | 6/2013 | Kanigicherla et al. ........ 713/100 |

* cited by examiner

*Primary Examiner* — Hamza Algibhah
(74) *Attorney, Agent, or Firm* — Brake Hughes Bellermann LLP (57) ABSTRACT

A computer system includes instructions recorded on a computer-readable storage medium and executable by at least one processor. The computer system includes a process component of a first deployment unit and a component module. The process component has a handling module and an object module. The handling module is operatively coupled to the object module. The handling module is operatively coupled to the component module. The handling module is configured to receive a message from a second deployment unit.

10 Claims, 6 Drawing Sheets

SYSTEMS AND METHODS FOR SENDING AND RECEIVING COMMUNICATIONS

TECHNICAL FIELD

This description relates systems and methods for providing and receiving communications, such as communications between different deployment units.

BACKGROUND

At times, it may be necessary or convenient for different business applications to communicate with one another. Specifically, the different business applications may communicate with one another via messages. For example, it may be necessary or convenient for different deployment units of a business or set of businesses to communicate with one another via messages. The different deployment units may be located or operated on the same system or they may be located or operated on different systems.

All types of information may be communicated between the different business applications. For example, messages communicated between different business applications may include information regarding a specific project or regarding remaining stock or inventory of a material within a business or unit.

Known systems and methods of communication between different business applications, such as different deployment units, may be difficult and time consuming to set up. Additionally, it may take a large amount of time for a message sent from one deployment unit to arrive at another deployment unit.

Accordingly, there is a need for more efficient systems and methods for sending and receiving messages between a first business application, such as a first deployment unit, and a second business application, such as a second deployment unit.

SUMMARY

According to one general aspect, A computer system includes instructions recorded on a computer-readable storage medium and executable by at least one processor. The computer system includes a process component of a first deployment unit and a component module. The process component has a handling module and an object module. The handling module is operatively coupled to the object module. The handling module is operatively coupled to the component module. The handling module is configured to receive a message from a second deployment unit.

According to another general aspect, a computer-implemented method for causing at least one processor to execute instructions recorded on a computer-readable storage medium, the method includes assembling a message to be sent from a first deployment unit to a second deployment unit different than the first deployment unit; determining whether the first deployment unit and the second deployment unit are located on the same system; and sending the message from the first deployment unit directly to the second deployment unit, if the first deployment unit and the second deployment unit are located on the same system.

According to another general aspect, a computer program product, the computer program product being tangibly embodied on a computer-readable medium and comprising instructions that, when executed, are configured to cause at least one processor to assemble a message to be sent from a first deployment unit to a second deployment unit different than the first deployment unit; determine whether the first deployment unit and the second deployment unit are located on the same system; and send the message from the first deployment unit directly to the second deployment unit, if the first deployment unit and the second deployment unit are located on the same system.

The details of one or more implementations are set forth in the accompanying drawings and the description below. Other features will be apparent from the description and drawings, and from the claims.

DETAILED DESCRIPTION

Figure 1:
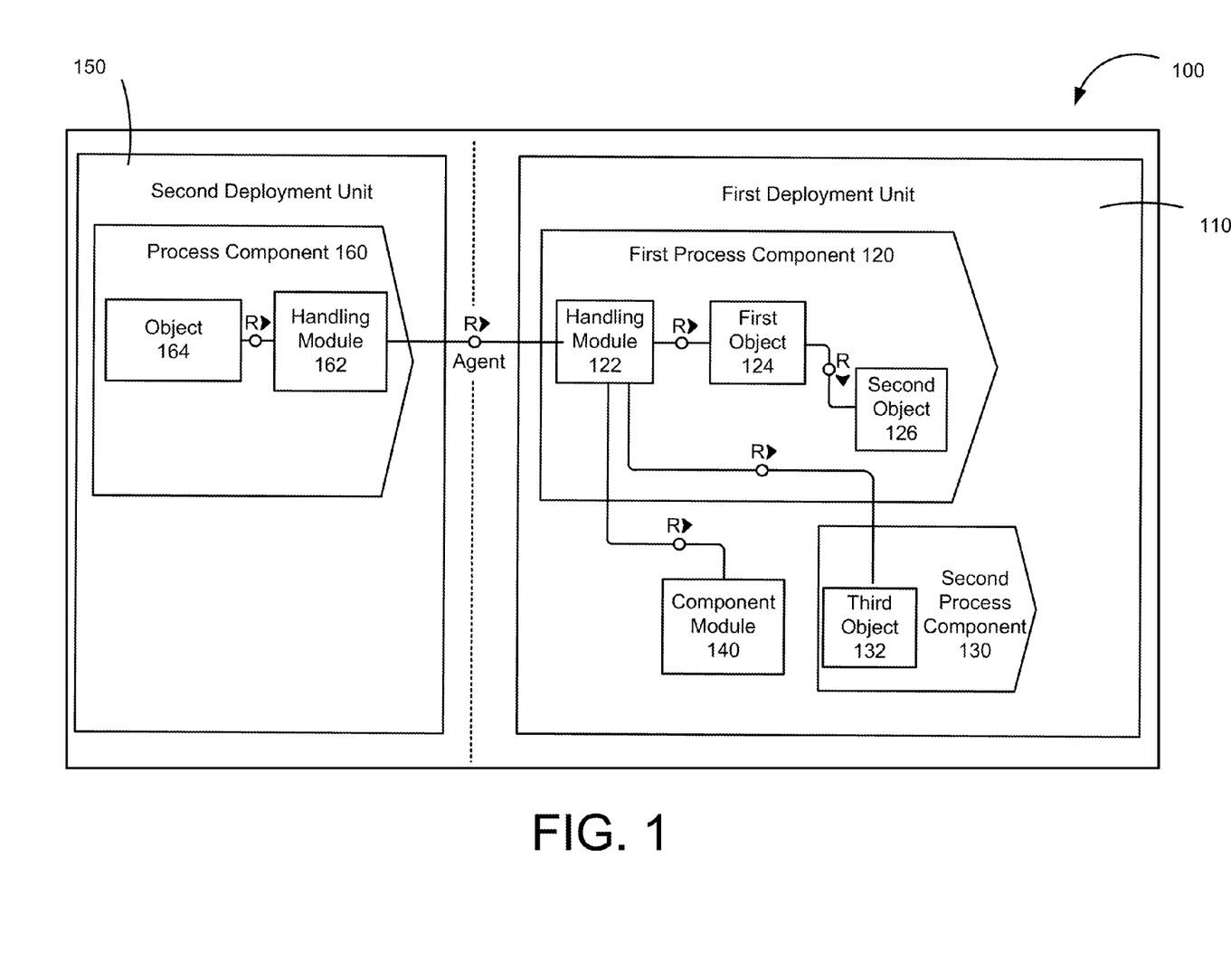
FIG. 1 is a block diagram of a system for sending and receiving communications.

FIG. 1 is a block diagram of a system 100 configured to provide for communication between business applications. Specifically, the system is configured to provide for the sending and receiving of messages between different business applications, such as different deployment units.

The system 100 includes a first deployment unit 110 and a second deployment unit 150. The system 100 allows for communications such as messages to be sent from one deployment unit, such as deployment unit 150, and received by the other deployment unit, such as deployment unit 110. Any type of message or information may be sent or communicated from one deployment unit, such as deployment unit 150, and received by the other deployment unit, such as deployment unit 110. The message may request information from one of the deployment units. For example, the message may request the status or existence of a particular project or may request the remaining stock of a particular material of one of the deployment units. In other embodiments, the messages include requests for or information related to other details of a project.

As discussed in more detail below, the message or communication from one of the deployment units, such as deployment unit 150, to another deployment unit, such as deployment unit 110, may be sent via a web service or the Internet. In other embodiments, if the deployment units 110 and 150 are located on the same system, then the message or communication from of the deployment units, such as deployment unit 150, to another deployment unit, such as deployment unit 110, may be sent directly, such as via a call, e.g., a remote function call.

The deployment unit 110 includes a first process component 120, a second process component 130, and a component module 140.

The first process component 120 includes a handling module 122, a first object module 124, and a second object module 126. The handling module 122 is operatively coupled to the first object module 124, the second object module 126, a third object module 132 of the second process component 130, and the component module 140. Specifically, handling module 122 is directly coupled to the first object module 124, the third object module 132, and the component module 140. The handling module 122 is operatively coupled to the second object module 126 via the first object module 124. As the handling module 122 is operatively coupled to the first object module 124, the second object module 126, the third object module 132, and the component module 140, the handling module 122 is configured to request information from or provide information to such modules. The handling module 122 is also configured to receive information from such modules.

In some embodiments, one or more portions of the components or modules of the systems disclosed herein, including system 100 illustrated in FIG. 1, can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). In some embodiments, the functionality of the modules or components can be included in different modules and/or components than those shown in FIG. 1.

In the illustrated embodiment, the handing module 122 is configured to receive messages from the second deployment unit 150. Specifically, in some embodiments, the handling module 122 is configured to receive requests for information related to the projects or other information of the object modules, such as the first object module 124, the second object module 126, and the third object module 132.

The handling module 122 is configured to communicate with the object modules 124, 126, and 132 and with the component module 140 to handle the message received from the second deployment unit 150. For example, in some embodiments, the handling module 122 is configured to retrieve or otherwise acquire information from the object modules 124, 126, and 132. As illustrated, the handling module 122 may be configured to communicate with object modules that are in the same processes component as the handling module 122 (such as object modules 124 and 126) and with object modules that are in a different process component (such as object module 132).

In some embodiments, the handling module 122 is configured to communicate with the object modules 124, 126, and 132 and the component module 140 via a local consumer proxy. In other embodiments, the handling module 122 is configured to communicate with the object modules 124, 126, and 132 and the component module 140 via other methods.

In the illustrated embodiment, the system 100 includes a second deployment unit 150. The second deployment unit 150 includes a process component 160 that has a handling module 162 and an object module 164. The handling module 162 is operatively coupled to the object module 164. In some embodiments, the handling module 162 is configured to communicate with the object module 164 via a local consumer proxy. In other embodiments, the handling module 162 is configured to communicate with the object module via other methods.

In some embodiments, the second deployment unit 150 is configured to determine whether the second deployment unit 150 and the first deployment unit 110 are on the same system, such as the same proprietary or enterprise system. In some embodiments, the deployment units are on the same proprietary system if the deployment units controlled by the same entity and are able to communicate with each other without the use of a web service or the Internet. If the deployment units 150 and 110 are on the same system, communications between the units proceed directly rather than via a web service or the Internet.

In some embodiments, the second deployment unit 150 includes a module that is configured to compile a message to be sent to the first deployment unit 110.

Figure 2:
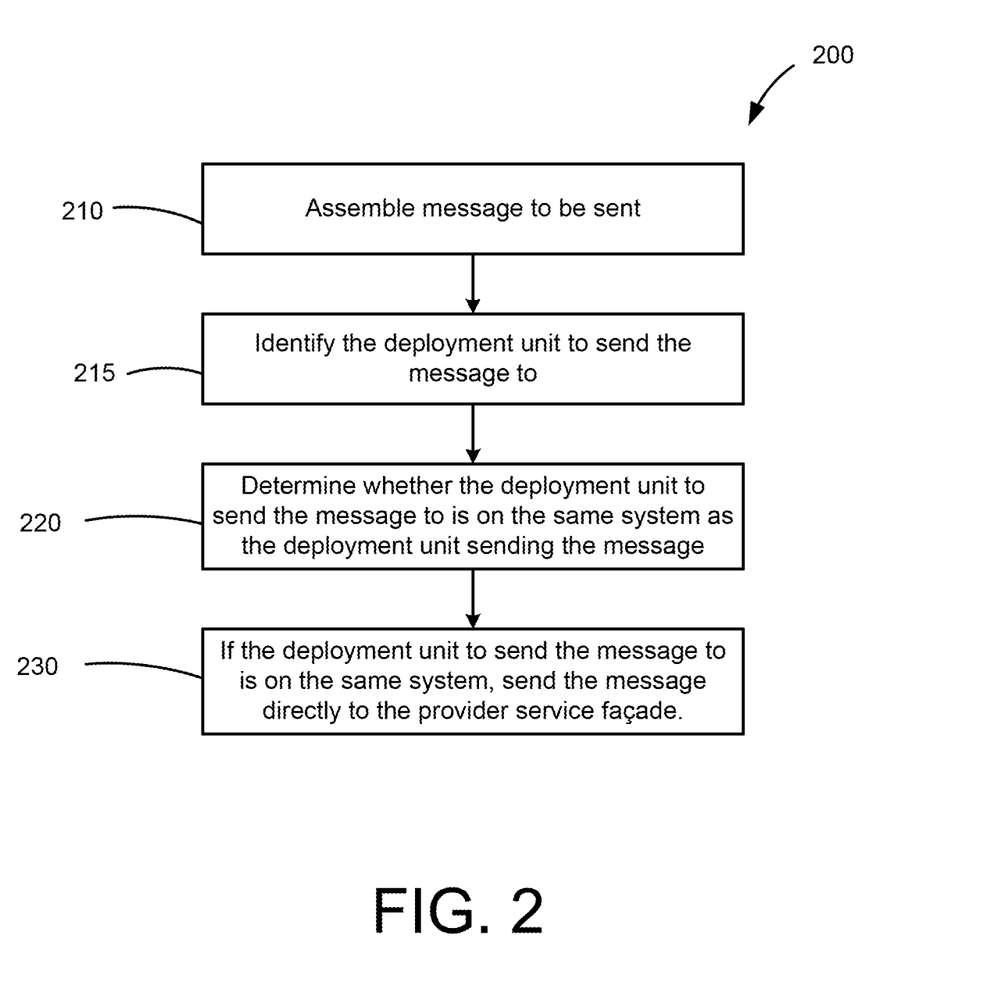
FIG. 2 is a flowchart illustrating example operations of the system of FIG. 1.

FIG. 2 is a flow chart of a method 200 for sending a message from one deployment unit to another deployment unit. For example, the method 200 may be used to send a message, such as a message requesting information from a different deployment unit or a message providing information to a different deployment unit.

The method 200 includes, at 210, assembling a message to send from one deployment unit to another deployment unit. In some embodiments, the assembling of the message includes providing a request for information in the message. In other embodiments, the assembling of the message includes providing information regarding a system or project as requested. In some embodiments, the handling module collects the necessary information (such as from the objects) and assembles the message. In other embodiments, another module, such as a outbound agent (discussed in more detail below), is configured to assemble the message.

At 215, the deployment unit to which the message is to be sent is identified. In some embodiments, the handling module, such as handling module 162 is configured to make such an identification.

At 220, the method 200 includes determining whether the deployment unit from which the message is to be sent and the deployment unit that is to receive the message on located on the same system, such as the same proprietary system. In some embodiments, the determination is made by the handling module of the deployment unit sending the message. For example, in some embodiments, the handling module makes the determination based on the business configuration as to whether the deployment units reside or are located on the same system.

In some embodiments, the method 200 also includes determining whether the deployment unit from which the message is to be sent and the deployment unit that is to receive the message require a decoupling. In other words, in some embodiments, a determination as to whether a decoupling of the deployment units is required during the messaging or communication between the deployment units.

At 230, the message is sent directly from the deployment unit that assembled the message to the deployment unit that is to receive the message. For example, in some embodiments, the message is sent without any intermediaries. For example, in some embodiments, the message is sent without the use of a web service (WS) or a proxy. For example, the message may be sent via the Internet. In some embodiments, the message is sent directly from one deployment unit to another deployment unit via a call or a remote function call. In other embodiments, the message is sent directly from one deployment unit to another deployment unit via a dynamic Advanced Business Application Programming (ABAP) method. In yet other embodiments, another software command is used to send the message directly from one deployment unit to another deployment unit.

In some embodiments, a module, such as an outbound agent (as discussed in more detail below) or a process agent framework (as discussed in detail below) is configured to send the message to the deployment unit that is to receive the message. In other embodiments, another module is configured to send the message to the deployment unit.

In some embodiments, if it is determined that the deployment unit from which the message is to be sent and the deployment unit that is to receive the message are located on different systems, the message is sent from one deployment unit to the other deployment unit via a web service. For example, in some embodiments, the message is sent via the Internet or other hypertext transfer protocol.

Figure 3:
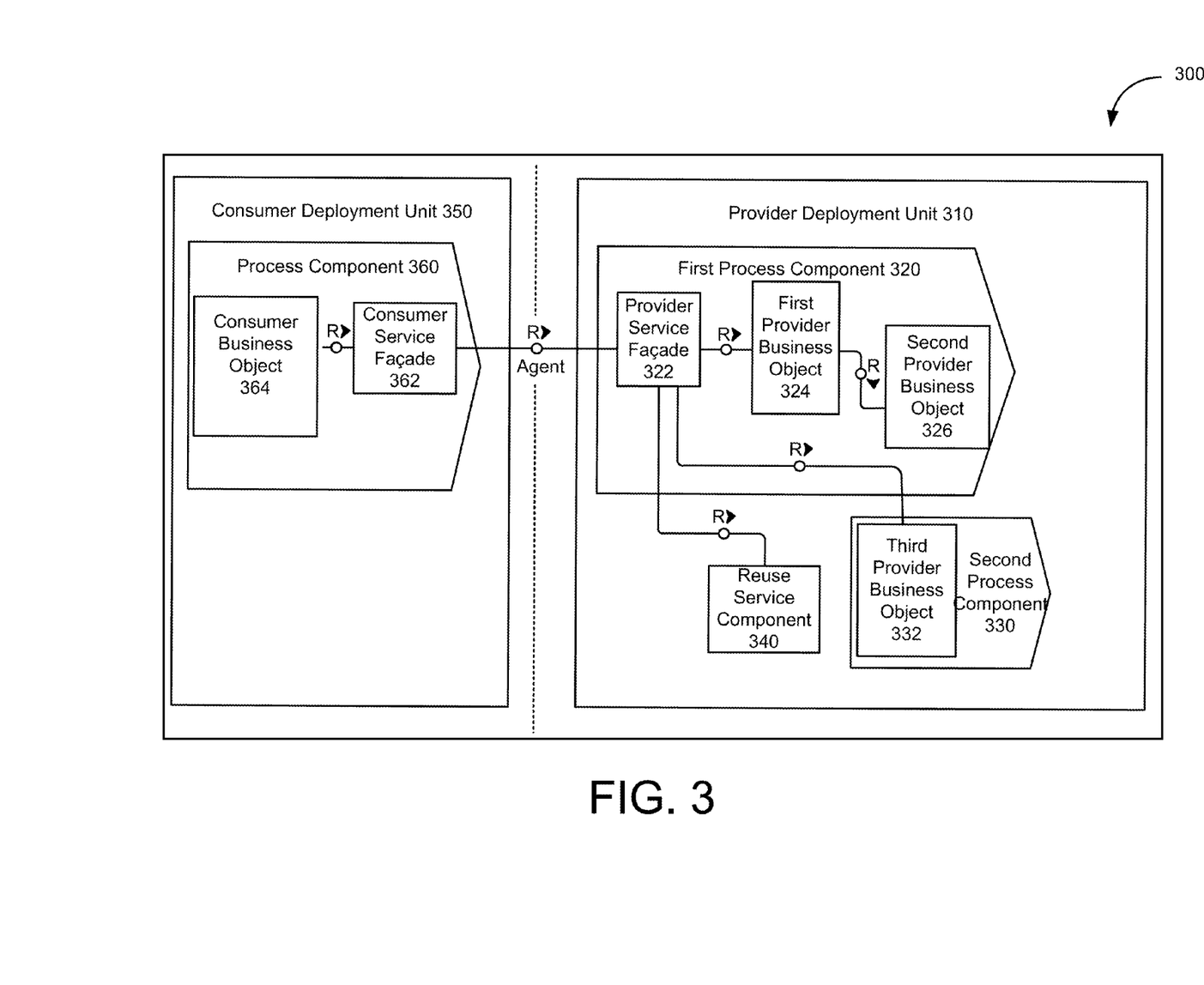
FIG. 3 is a schematic diagram illustrating an example of a system for sending and receiving communications.

FIG. 3 is a block diagram of a system 300 configured to provide for communication between business applications. Specifically, the system is configured to provide for the sending and receiving of messages between different business applications, such as different deployment units. The system 300 includes a first deployment unit or provider deployment unit 310 and a second deployment unit or consumer deployment unit 350. The system 300 allows for communications, such as messages, to be sent from one deployment unit, such as deployment unit 350, and received by the other deployment unit, such as deployment unit 310. Any type of message or information may be sent or communicated from one deployment unit, such as deployment unit 350, and received by the other deployment unit, such as deployment unit 310. The message may request information from one of the deployment units. For example, the message may request the status or existence of a particular project or may request the remaining stock of a particular material of one of the deployment units. In other embodiments, the messages include requests for or information related to other details of a project.

As discussed in more detail below, the message or communication from one of the deployment units, such as deployment unit 350, to another deployment unit, such as deployment unit 310, may be sent via a web service (WS) or the Internet. In other embodiments, if the deployment units 310 and 350 are located on the same system (such as the same proprietary system), then the message or communication from of the deployment units, such as deployment unit 350, to another deployment unit, such as deployment unit 310, may be sent directly, such as via a call, e.g., a remote function call.

In the illustrated embodiment, the first deployment unit or provider deployment unit 310 includes a first process component 320, a second process component 330, and a component module or reuse services component 340. The first process component 320 includes a handling module or provider service façade 322, a first object or first provider business object (BO) 324, and a second object or second provider business object 324. The second process component 330 includes a third object or third provider business object 332.

In the illustrated embodiment, the second deployment unit or consumer deployment unit 350 includes a process component 360. The process component 360 includes a handing module or consumer service façade 362 and an object or business object 364.

In the illustrated embodiment, the provider service façade 322 is a coarse-granular static typed operation of an ABAP class. The provider service façade 322 is operatively coupled to the business objects 324, 326 and 332 and to the reuse services component (RSC) 340. The provider service façade 322 is configured to communicate with the business objects 324, 326, and 332 and the reuse services component 340. In some embodiments, the provider service façade 322 is configured to implement the choreography on the business objects 324, 326, and 332 and the reuse services component 340.

In some embodiments, the provider service façade 322 can be called within the provider deployment unit 320. In other embodiments, as described in more detail below, in some embodiments, the provider service façade 322 can be called or send a message from the consumer service façade 362 from another deployment unit 350. In some embodiments, the consumer service façade 362 may use a process agent to communicate with the provider service façade 322. In some embodiments, local consumer proxy (LCP) calls are not allowed since the business logic of the provider is not transparent to the consumer.

In some embodiments, the provider service façade 322 and the consumer service façade 362 are each modeled or stored in a memory. For example, in some embodiments, the provider service façade 322 and the consumer service façade 362 are modeled in the metadata repository. In some embodiments, if an object associated with one of the service facades, such as the first business object 324 and the provider service façade 322 can be identified, then the service façade may also be visible and maintainable in the business object editor of the metadata repository workbench.

In some embodiments, based on the metadata information of the provider service façade 322 the classes, interfaces, data types, and all other needed development artifacts and modules in the consumer deployment unit 350 may be generated. This generation includes the service interfaces, message types, and process component interaction models. The used data types may be based on global data types (GDT) to ensure that all other needed data types, such as the agent message types, can be generated automatically without any further process or processing.

In some embodiments, the consumer service façade 362 is configured to determine or decide, on the basis of the deployment and activation of the deployment units, that the provider service façade 322 may be called directly (single deployment or deployments units located on the same system) or that process agents should be used (distributed deployment or deployment units located on different systems). In some embodiments, the required transactional behavior is part of the service façade operation signature to determine or decide whether a read-only service façade can be performed in the same transaction of the consumer façade deployment unit or whether a separate transaction should be used.

Figure 4:
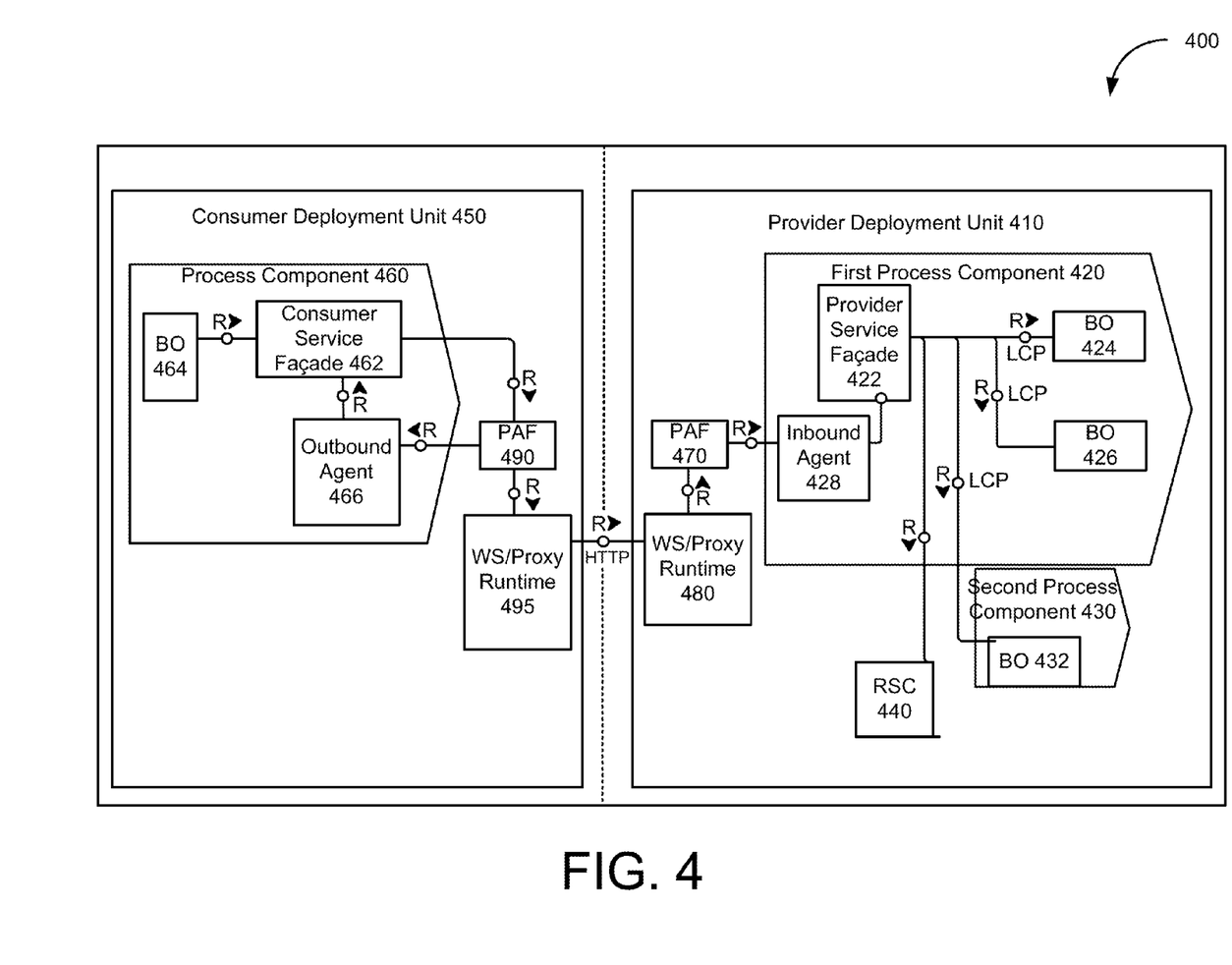
FIG. 4 is a schematic diagram illustrating another example of a system for sending and receiving messages.

FIG. 4 is a block diagram of a system 400 configured to provide for communication between business applications. Specifically, the system 400 is configured to provide for the sending and receiving of messages between different business applications, such as different deployment units. More specifically, the system 400 is configured to provide for the sending and receiving of messages between deployment units that are located or operating on different systems.

The system 400 includes a first deployment unit or provider deployment unit 410 and a second deployment unit or consumer deployment unit 450. The system 400 allows for communications, such as messages, to be sent from one deployment unit, such as deployment unit 450, and received by the other deployment unit, such as deployment unit 410. Any type of message or information may be sent or communicated from one deployment unit, such as deployment unit 450, and received by the other deployment unit, such as deployment unit 410. The message may request information from one of the deployment units. For example, the message may request the status or existence of a particular project or may request the remaining stock of a particular material of one of the deployment units. In other embodiments, the messages include requests for or information related to other details of a project.

In the illustrated embodiment, the first deployment unit or provider deployment unit 410 includes a first process component 420, a second process component 430, a component module or reuse services component 440, a process agent framework (PAF) 470, and a proxy runtime module 480. The first process component 420 includes a handling module or provider service façade 422, a first object or first provider business object 424, and a second object or second provider business object 424. The second process component 430 includes a third object or third provider business object 332.

In the illustrated embodiment, the second deployment unit or consumer deployment unit 450 includes a process component 460. The process component 460 includes a handing module or consumer service façade 462 and an object or business object 464. The second deployment unit or consumer deployment unit 450 also includes a process agent framework 490 and a proxy runtime module 495.

In the illustrated embodiment, the provider service façade 422 is configured to execute or choreograph the process using the business objects 424, 426, and 432 and reuse service components 440 of the provider deployment unit 410. Specifically, in the illustrated embodiment, the business objects are called or communicated with using the local consumer proxy (LCP). In the illustrated embodiment, the provider service façade 422 is an ABAP class which provides the service operations as static stateless ABAP class methods with a well-defined typed signature.

The consumer service façade proxy 462 is provided in the consumer deployment unit 450 as an ABAP class which provides the service operations as static stateless ABAP class methods with a type compatible signature. In some embodiments, if the data types of the provider or the provider service façade 422 are not available in the ABAP package of the consumer deployment unit 450 then type compatible data types may be provided.

As illustrated, in the distributed deployment model (the deployment units are located within different systems) the communication between the two deployment units will be realized by an agent communication. The parameters of the service operation of the consumer service façade 462 are stored in the context of the service façade 462 ABAP class as static private attributes. In the illustrated embodiment, the implementation of the static service operation calls the process agent framework (PAF) 490 via an intermediate process step (IPS) interface.

The PAF 490 determines the corresponding outbound agent 466 and triggers the outbound agent 466 which reads the parameter of the operation signature from the static private attributes of the service façade 462 ABAP class and assembles the message which will be send via the web service runtime 495 to the provider deployment unit 410.

In the illustrated embodiment, to get access to the static private members of the consumer service façade 462 ABAP class, the outbound agent 466 ABAP class must be a friend class of the consumer service façade 462 ABAP class. In some embodiments, the parameters are cleared after they have been read.

The web service call is sent from the web service runtime 495 via the Internet and is received in the provider deployment unit 410 by the web service runtime 480 which calls the process agent framework (PAF) 470. The process agent framework (PAF) 470 determines the ABAP class of the inbound agent 428 which will be instantiated and called. The inbound agent 428 is configured to disassemble the message and call the corresponding static typed operation of the provider service façade 422 ABAP class. The result of the operation will be an assembled response message which will be sent back to the consumer deployment unit 450.

In some embodiments, the outbound agent 466 receives the response, disassembles the response message, and stores the result parameter in the private attributes of the consumer service façade 462 ABAP class. At the end of the communication and when the call stack is back to the consumer service operation, the result parameters will be copied from the private attributes and returned to the calling consumer business object 464. In some embodiment, before returning the consumer service operation clears the private attributes for the temporarily storage of the parameters.

In some embodiments, an error log will be provided. For example, the error log may provide an indication that a message was not appropriately received by one of the deployment units.

In some embodiments, the consumer business object 464 is configured to ensure that a failing call of the consumer service façade 462 due to missing activity (not scoped) does not impact the business process. The consumer business object 464 may determine or decide with respect to the business configuration whether the usage of the service façade 462 makes sense from the current business perspective or not. In some embodiments, the service façade 462 ABAP class is not configured to make such business relevant decision.

In some embodiments, the provider service façades 422 and 462 are modeled in the metadata repository. Additionally, if a leading business object of a service façade can be identified then the service façade shall also be visible and maintainable in the business object editor of the metadata repository workbench.

In some embodiments, the provider service façade 422 is implemented as an ABAP class. The class and the static methods of the provider service façade 422 may be generated with the signature described by a transformation definition.

In some embodiments, master data records (MDRS) are configured to ensure that only GDTs can be used for the parameters of the signature. In some embodiments, it may not be possible to activate service facades which do not use only GDTs.

In some embodiments, the meta-object instance of the provider service façade 422 contains an indicator. The indicator is configured to provide an indication as to whether it is possible to call the provider service façade 422 within the same transaction.

In some embodiments, the provider service façade 422 (or the meta-object instance of the provider service façade 422) contains a read only indicator. This red only indicator describes also that the provider service façade 422 is cross-deployment unit read enabled. In some embodiments, only read-only services can be cross-deployment unit enabled. The editor of cross-deployment unit enabled service facades may contain a separate tab screen to show the list of the corresponding existing consumer service façades in other deployment units.

In some embodiments, the system 400 may provide an error log. In some embodiments, the error log or error handling is based on return error codes/values which are provided on the provider service façade 422. In some embodiments, ESI error messages are not used. In such embodiments, the consumer of the consumer service façade 462 is responsible to handle and provide ESI compliant error messages.

In some embodiments, it is possible to provide documentation (service oriented architecture (eSOA) documentation) of the provider service façade 422 based on the knowledge transfer meta-object.

In some embodiments, the generation of the consumer service façade 462 may be done or completed in each software layer. Additionally, in some embodiments, new consumer service facades are generated in networked applications.

In some embodiments, using a read only provider service façade 422 it is possible in the MDRS to generate a consumer service façade 462 for a specific deployment unit. In such embodiments, all needed dependent development objects are generated. Specifically in some embodiments, the following development objects may be generated.

1. Consumer service façade ABAP class including implementation is generated. The implementation may analyze the business configuration to decide whether to use communication via process agent or via direct ABAP method call (such as a dynamic invoke). The process agent communication may be used in case of distributed deployment (deployment units on different systems) or if transaction separation is required. In case of single deployment (deployment units on the same system) and transaction separation is not required then the provider service façade can be called directly via dynamic invoke. In case of process agent communication, the importing and exporting parameters may be stored as private static attributes in the consumer service façade ABAP class and the generated outbound agent may use these parameters instead of making LCP calls. The implementing outbound agent ABAP class may be a friend class of the consumer service façade ABAP class.
2. The request and response message types based on the signature of the provider service façade may be generated for the inbound and outbound agent.
3. The needed message data types using the GDTs of the provider service façade signature shall be generated.
4. The inbound and outbound service interfaces including the operations are generated based on the methods of the provider service façade.
5. The inbound and outbound process agents including its implementation are be generated.
6. The intermediate process step shall be generated and shall be used in the implementation of the consumer service façade.
7. The process component interaction is generated.

In some embodiments, if the provider service façade 422 has no leading object then it is a first class citizen in the repository and shall be maintained by a special service façade editor.

In some embodiments, the importing and exporting signature of the provider service façade 422 shall be modeled and available as a transformation definition as a meta-object supplement.

In some embodiments, the ESF checks at runtime whether only successive read LCP calls are performed within a read only provider service façade 422. In such embodiments, in case of a violation an exception may be raised.

Figure 5:
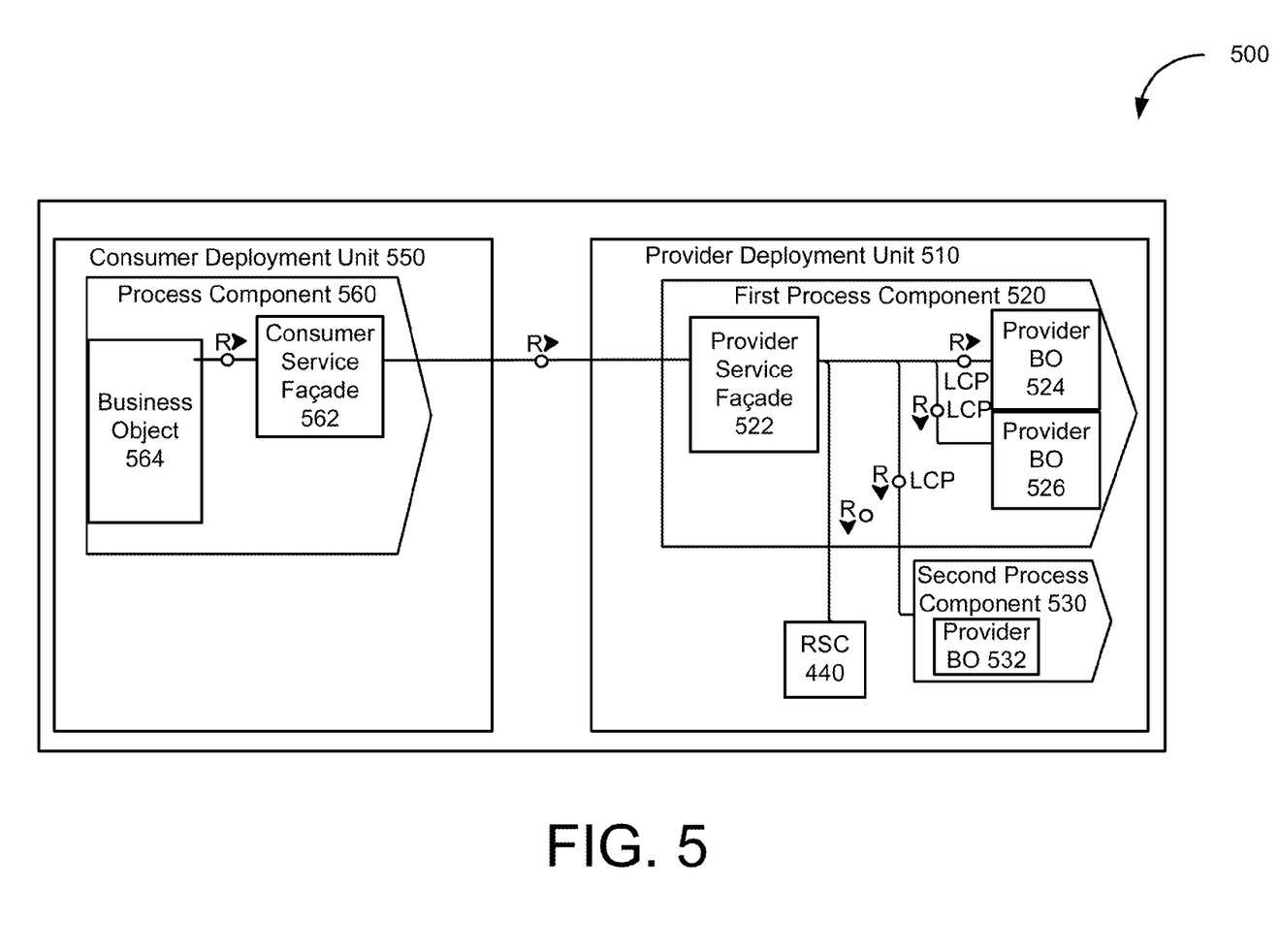
FIG. 5 is a schematic diagram illustrating another example of a system for sending and receiving messages.

FIG. 5 is a block diagram of a system 500 configured to provide for communication between business applications. Specifically, the system 500 is configured to provide for the sending and receiving of messages between different business applications, such as different deployment units. More specifically, the system 500 is configured to provide for the sending and receiving of messages between deployment units that are located or operating on the same system.

The system 500 includes a first deployment unit or provider deployment unit 510 and a second deployment unit or consumer deployment unit 550. The system 500 allows for communications, such as messages, to be sent from one deployment unit, such as deployment unit 550, and received by the other deployment unit, such as deployment unit 510. Any type of message or information may be sent or communicated from one deployment unit, such as deployment unit 550, and received by the other deployment unit, such as deployment unit 510. The message may request information from one of the deployment units. For example, the message may request the status or existence of a particular project or may request the remaining stock of a particular material of one of the deployment units. In other embodiments, the messages include requests for or information related to other details of a project.

In the illustrated embodiment, the first deployment unit or provider deployment unit 510 includes a first process component 520, a second process component 530, and a component module or reuse services component 540. The first process component 520 includes a handling module or provider service façade 522, a first object or first provider business object 524, and a second object or second provider business object 524. The second process component 530 includes a third object or third provider business object 532.

In the illustrated embodiment, the second deployment unit or consumer deployment unit 550 includes a process component 560. The process component 560 includes a handing module or consumer service façade 562 and an object or business object 564.

If single deployment model (both deployment units are located on the same system) is used and transactional session decoupling for the read only scenario is not required, then the consumer service façade 562 calls the provider service façade 522 directly. For example, in some embodiments, the consumer service façade 562 may call the provider service façade 522 via a dynamic ABAP method invoke.

In some embodiments, the consumer service façade 562 includes an indicator to provide an indication that the provider service façade 522 may be called within a single transaction. For example, in some embodiments, the consumer service façade 562 includes a meta-object instance that contains an indicator as to whether it is possible to call the provider service façade 522 within the same transaction. It can then be decided at runtime via a parameter in the service operation signature whether the call will be performed in the same or in a separate transaction (roll area) via process agents. In some embodiments, the indicator helps to optimize performance of the communications.

In some embodiments, another indicator tags the service façade meta-object instance as cross-deployment unit enabled. In such embodiments, only read-only services can be cross-deployment unit enabled. The editor of cross-deployment unit enabled service facades shall contain a separate tab screen to show the list of the corresponding existing consumer service façade proxies in other deployment units.

Figure 6:
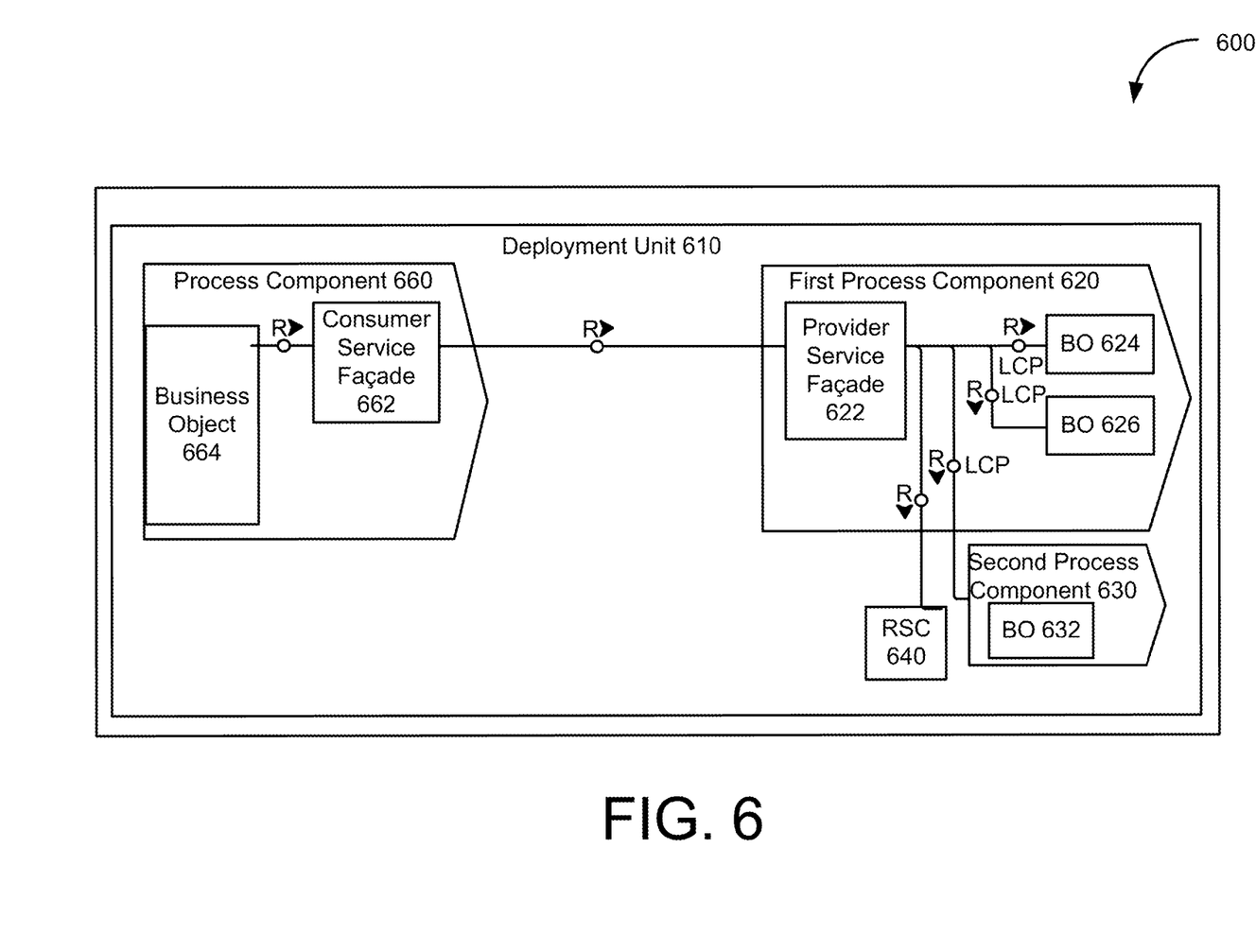
FIG. 6 is a schematic diagram illustrating another example of a system for sending and receiving messages.

FIG. 6 is a block diagram of a system 600 configured to provide for communication between business applications. Specifically, the system 600 is configured to provide for the sending and receiving of messages.

Any type of message or information may be sent or communicated in the system of FIG. 6. The message may request information. For example, the message may request the status or existence of a particular project or may request the remaining stock of a particular material. In other embodiments, the messages include requests for or information related to other details of a project.

As illustrated in FIG. 6, in some embodiments, the consumer service façade 662 will call the provider service façade 622 ABAP class directly in case that the consumer and the provider are part of the same deployment unit 610. Also in this case, it is ensured that the provider implementation is available as a static typed operation of an ABAP class.

The service façades 622 and 662 are modeled in the metadata repository. If a leading business object of a service façade can be identified then the service façade shall also be visible and maintainable in the business object editor of the metadata repository workbench. Otherwise the service facade is a first class citizen in the repository and will be maintained by a special service façade editor.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium) or in a propagated signal, for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A computer system including instructions recorded on a computer-readable storage medium and executable by at least one processor, the computer system comprising:
   a first deployment unit, implemented as instructions recorded on the computer-readable storage medium and executable by the at least one processor, configured to receive a message requesting information from a second deployment unit, the first deployment unit including a process component including,
   a handling module, implemented as instructions recorded on the computer-readable storage medium and executable by the at least one processor, configured to,
      generate an interface between a process associated with the process component and the second deployment unit,
      determine whether the first deployment unit and the second deployment unit are coupled,
         if the first deployment unit and the second deployment unit are coupled, the interface is configured to communicate with the second deployment unit via a function call, and
         if the first deployment unit and the second deployment unit are decoupled, the interface is configured to communicate with the second deployment unit via an internet service call, and
      communicate with the process via a local consumer proxy;
   an object module, implemented as instructions recorded on the computer-readable storage medium and executable by the at least one processor, configured to provide a function included in the process associated with the process component; and
   a component module, implemented as instructions recorded on the computer-readable storage medium and executable by the at least one processor, configured to provide a reusable service in the process associated with the process component,
   the handling module being operatively coupled to the object module, the handling module being operatively coupled to the component module, the handling module being further configured to choreograph the process associated with the process component using the object module and the component module.

2. The computer system of claim 1, wherein the object module is a first object module, the process component including a second object module, the handling module being operatively coupled to the second object module.

3. The computer system of claim 1, wherein the process component is a first process component and the object module is an object module, the system further comprising:
- a second process component having a second object module, the handling module being operatively coupled to the second object module.

4. The computer system of claim 1, wherein the handling module is configured to communicate with the object module via a local consumer proxy.

5. The computer system of claim 1, the process component being a first processing component, the handling module being a first handling module, the object module being a first object module, the system further comprising:
- a second process component of the second deployment unit having a second handling module and a second object module,
- the second handling module being operatively coupled to the second object module.

6. The computer system of claim 1, the process component being a first processing component, the handling module being a first handling module, the object module being a first object module, the system further comprising:
- a second process component of the second deployment unit having a second handling module and a second object module,
- the second handling module being operatively coupled to the second object module,
- the second handling module being configured to communicate with the first handling module, the second handling module being configured to determine whether the second handling module and the first handling module are located on the same system.

7. The computer system of claim 1, the process component being a first processing component, the handling module being a first handling module, the object module being a first object module, the system further comprising:
- a second process component of the second deployment unit having a second handling module and a second object module,
- the second handling module being operatively coupled to the second object module, the second handling module being configured to store parameters of a service operation.

8. The computer system of claim 1, the process component being a first processing component, the handling module being a first handling module, the object module being a first object module, the system further comprising:
- a second process component of the second deployment unit having a second handling module and a second object module,
- the second handling module being operatively coupled to the second object module, the second handling module being configured to store parameters of a service operation as attributes.

9. The computer system of claim 1, the process component being a first processing component, the handling module being a first handling module, the object module being a first object module, the system further comprising:
- a second process component of the second deployment unit having a second handling module, a second object module, and an outbound agent; and
- a process agent framework,
- the second handling module being operatively coupled to the second object module, the outbound agent, and the process agent framework, the process agent framework being configured to cause the outbound agent to read a parameter of an operation from the second handling module.

10. The computer system of claim 1, the process component being a first processing component, the handling module being a first handling module, the object module being a first object module, the system further comprising:
- a second process component of the second deployment unit having a second handling module, a second object module, and an outbound agent,
- the outbound agent being configured to assemble the message.

* * * * *